US009407521B1

(12) United States Patent
 Kulkarni

(10) Patent No.: US 9,407,521 B1
(45) Date of Patent: Aug. 2, 2016

(54) METHOD AND SYSTEM TO VISUALLY REPRESENT THE STATUS OF A DATA CENTER

(75) Inventor: Shantanu Kulkarni, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 678 days.

(21) Appl. No.: 13/473,223

(22) Filed: May 16, 2012

(51) Int. Cl.
  *G06F 15/173* (2006.01)
  *H04L 12/26* (2006.01)
(52) U.S. Cl.
  CPC ............ *H04L 43/08* (2013.01); *H04L 43/0876* (2013.01)
(58) Field of Classification Search
  CPC ... H04L 41/0893; H04L 41/22; H04L 43/045; H04L 43/08; H04L 43/0876
  USPC ......................................................... 709/224
  See application file for complete search history.

(56) References Cited

U.S. PATENT DOCUMENTS

| | | | |
|---|---|---|---|
| 8,898,402 B1* | 11/2014 | Stronge .......................... | 711/154 |
| 2007/0094348 A1 | 4/2007 | Scheidel et al. | |
| 2007/0300220 A1 | 12/2007 | Seliger et al. | |
| 2008/0178298 A1 | 7/2008 | Arai et al. | |
| 2009/0199116 A1 | 8/2009 | von Eicken et al. | |
| 2009/0235267 A1* | 9/2009 | McKinney et al. ........... | 718/104 |
| 2009/0300607 A1 | 12/2009 | Ferris et al. | |
| 2009/0300641 A1 | 12/2009 | Friedman et al. | |
| 2010/0257536 A1 | 10/2010 | Srinivasan | |
| 2011/0093847 A1 | 4/2011 | Shah | |
| 2013/0067378 A1* | 3/2013 | Au et al. ......................... | 715/771 |
| 2013/0169666 A1* | 7/2013 | Pacheco et al. ............... | 345/594 |

OTHER PUBLICATIONS

Srinivasan et al, "Dynamic Remote Host Classification in Grid Computing using Clonalg", 2010, International Conference and Workshop on Emerging Trends in Technology, ICWET 2010, all pages.*
"vFoglight: VMware & Hyper-V Performance Monitoring and Capacity Management", Quest Software, Inc., 2011, http://web.archive.org/web/20111121062100/http://www.quest.com/vfoglight, 15 pages. [Retrieved Jun. 30, 2015].
"Solarwinds Storage Manager: For Your Physical & Virtualized Infrastructure", SolarWinds.com, 2011, http://web.archive.org/web/20111127141736/http://www.solarwinds.com/products/storage-management/, 3 pages. [Retrieved Jun. 30, 2015].

* cited by examiner

*Primary Examiner* — Hua Fan
(74) *Attorney, Agent, or Firm* — Rory D. Rankin; Meyertons, Hood, Kivlin, Kowert & Goetzel, P.C.

(57) ABSTRACT

A system, method, and medium for generating a visual representation of a data center. The data center includes multiple cloud groups, and each cloud group is represented with a circle in the visual representation. The size of the circle represents the aggregate capacity of the cloud group. The visual representation is a scatter plot with a horizontal axis measuring health and a vertical axis measuring available capacity. Circles are placed within the scatter plot based on the health and available capacity of their corresponding cloud groups. The color of the circle is based on the health of the corresponding cloud group, and the density of the color is based on the available capacity of the corresponding cloud group.

20 Claims, 7 Drawing Sheets

METHOD AND SYSTEM TO VISUALLY REPRESENT THE STATUS OF A DATA CENTER

BACKGROUND OF THE INVENTION

1. Field of the Invention

The present invention relates generally to computer systems, and in particular to a method and system for providing a visual representation of computing resource capacities, such as that of individual resources or any group of resources.

2. Description of the Related Art

Companies and organizations often maintain computer networks and data centers to conduct regular business operations. Virtualization of networks, clusters, cloud groups, servers, and storage has allowed companies to increase the efficiency with which data centers can be operated. As used herein, a "cloud group" may refer to any grouping of resources or any identifiable (logical) container entity corresponding to one or more resources. However, managing the data center continues to be a challenging endeavor as the amount of data stored in the data center increases with time and as the number of virtual machines, clusters, and cloud groups increases.

Organizing and managing a data center usually relies on management software for monitoring the data center and taking necessary actions. Most management software available provides status regarding the resources of a data center in a hierarchical structure. Currently, there is not a single view that provides an administrator with an overview of the health and available capacity in the data center. Also, performing actions like allocating and reclaiming storage are typically not integrated as part of the visual representation.

In view of the above, improved methods and mechanisms for generating displays of capacity utilization in a data center are desired.

SUMMARY OF THE INVENTION

Various embodiments of methods and mechanisms for generating a visual representation of the status of a data center and cloud groups within the data center are contemplated. The visual representation may provide an indication of the current state of performance of the various cloud groups within the data center. The visual representation may be interactive, such that resource allocation in the data center may be modified through actions (e.g., point-and-click, drag-and-drop) taken within the visual representation.

In one embodiment, the visual representation may utilize a scatter plot of cloud groups, and each cloud group may be represented as a circle within the representation. One axis of the scatter plot may indicate available capacity, and the other axis may indicate the health status of the cloud groups. For example, in one embodiment, the Y axis may be used to indicate available capacity where circles that are situated at the top of the chart represent cloud groups with the most available capacity. The circles located at the bottom of the chart represent the cloud groups with the least available capacity. Also, in this embodiment, the X axis may indicate the health of the cloud groups. Circles that are situated on the left side of the chart represent faulted cloud groups, while circles that are situated toward the right-side of the chart represent healthier cloud groups. The size of each circle may indicate the total aggregate capacity of the corresponding cloud group's resources.

In addition, in various embodiments the color of a circle may also provide an indication of the health and/or the available capacity of the corresponding cloud group. For example, in one embodiment, different colors may be utilized with the circles to represent the health of the corresponding cloud groups. In one embodiment, three colors may be utilized to represent three separate health states, with red representing "faulted", orange representing "at risk", and green representing "healthy". In other embodiments, other numbers of colors besides three may be utilized, and other colors besides red, orange, and green may be utilized with the visual representation. Furthermore, the color density of the circle may be utilized to indicate the available capacity. For example, a darker or deeper color may be used to indicate less available capacity and a lighter or less dense color may be used to indicate more available capacity.

In one embodiment, a user may be able to obtain more detailed information on a given cloud group by hovering the mouse cursor above its corresponding circle. When the cursor is placed above a given circle, a pop-up box with more specific information and selectable tasks may be displayed. For example, in one embodiment, more detailed information may include CPU utilization, memory utilization, disk input/output (I/O) utilization, network I/O utilization, and other information. In addition, one or more tasks may be listed which may be selected by the user. For example, tasks may include allocating storage, reclaiming storage, as well as other tasks.

Furthermore, in some embodiments, the visual representation may allow a user or administrator to perform resource placement, such as the placement of a new virtual machine within a cloud group. In one embodiment, a new virtual machine may appear as a white circle that can be moved within the scatter plot. The size of the circle representing the new virtual machine may indicate the required capacity to host the virtual machine. This may allow the user to visually judge which cloud group circles have enough resources to host the new virtual machine. The user may drag and drop the new virtual machine circle to a cloud group circle. In some embodiments, the visual representation application may recommend the best available cloud group for placing the new virtual machine. The visual representation application may recommend the best available cloud group by highlighting the corresponding circle. Then, the user may take the final step of dragging and dropping the virtual machine circle into the recommended cloud group circle. Performing the drag and drop may result in the virtual machine being provisioned within the corresponding cloud group.

In other embodiments, other entities may be represented with a circle in the visual representation. For example, in another embodiment, a cluster, a node, a server, a computing device, or a virtual machine may be represented with a circle, and the scatter plot may show a plurality of these entities within a network or system. Furthermore, in other embodiments, other shapes besides circles may be utilized to represent the entities depicted in the visual representation.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION

Figure 1:
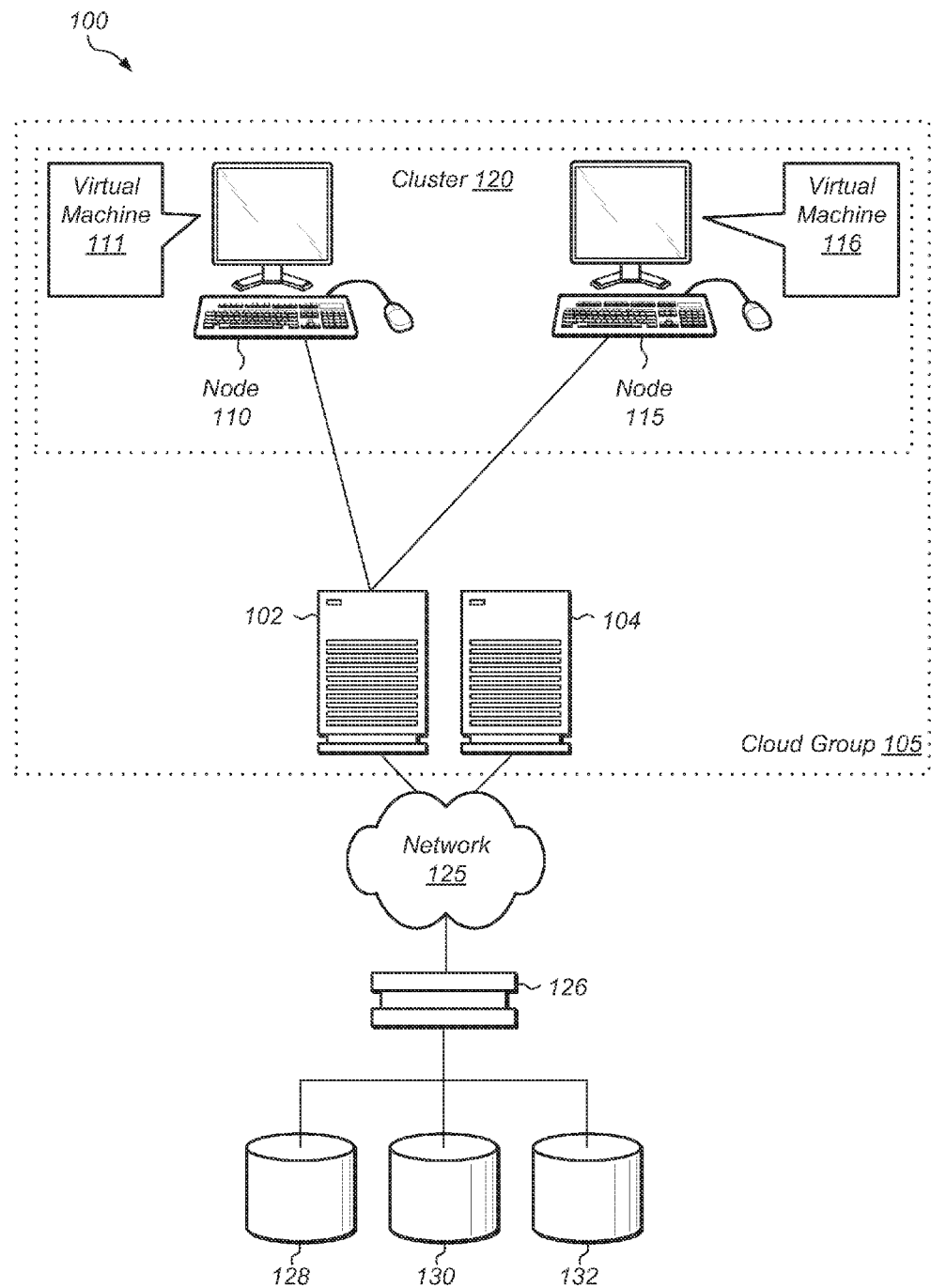
FIG. 1 is a diagram that illustrates a data center architecture in accordance with one or more embodiments.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a server . . . . " Such a claim does not foreclose the system from including additional components (e.g., a storage device, a storage controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring to FIG. 1, a generalized block diagram of one embodiment of a data center architecture is shown. Data center 100 may include cloud group 105, which includes application servers 102 and 104. Cluster 120 may be hosted by application server 102, and cluster 120 is representative of any number of clusters that may be coupled to application server 102. Although not shown in FIG. 1, application server 104 may also host any number of clusters. Generally speaking, a cluster, such as cluster 120, is a group of linked nodes, such as nodes 110 and 115. As used herein, the term "node" refers to a computer system. The term "cluster" refers to a system including a group of two or more nodes that operate in coordination with each other to increase the availability of an application. It is noted that while the present discussion describes computing resources as cloud groups, the methods and mechanisms described herein may be applied to computing resources including any number of resources. For example, a single application or processor may represent the computing resources. Alternatively, a cloud group may include numerous servers, databases, application, and other resources. All such embodiments are contemplated herein.

Nodes 110 and 115 may be connected to one another through fast local area networks (LANs), which are not shown to simplify the illustration. Nodes 110 and 115 are representative of any number of nodes which may be part of cluster 120. Each node may be a single computer or a multi-processor system. Virtual machine 111 runs on node 110, and virtual machine 111 is representative of any number of virtual machines which may execute on node 110. Similarly, virtual machine 116 runs on node 115, and virtual machine 116 is representative of any number of virtual machines which may execute on node 115. Virtual machines 111 and 116 may each execute one or more software applications. The term "virtual machine" refers to a software implementation of a computing system that executes program instructions like a physical machine. Virtual machines may be designed to run specific applications or implement entire system platforms with complete operating systems. In some instances, a single computing system may execute multiple virtual machines simultaneously using a virtual machine monitor to manage the virtual machines.

Applications server 102 may be connected to node 110 and node 115 through any of a variety of direct or network connections. Applications server 102 may host one or more software applications associated with virtual machines 111 and 116, including a hypervisor. A hypervisor may be a virtualization layer or module configured to mask low-level hardware operations from one or more guest operating systems executing on virtual machines 111 and 116. The hypervisor may allow multiple operating systems to execute on a single server (i.e., applications server 102). Any number of other software applications may also be hosted by applications server 102. Applications servers 102 and 104 are representative of any number of applications servers or other types of servers which may be part of cloud group 105. In other embodiments, applications server 102 may be a media server, master server, host server, file server, data server and/or other type of server.

Applications servers 102 and 104 are connected to network 125. Network 125 may comprise a variety of network connections including combinations of local area networks (LANs), such as Ethernet networks, Fibre Channel (FC) networks, token ring networks, and wireless local area networks (WLANs) based on the Institute of Electrical and Electronics Engineers (IEEE) 802.11 standards (Wi-Fi), and wide area networks (WANs), such as the Internet, cellular data networks, and other data communication networks such as a virtual private network (VPN) implemented over a public network (e.g., the Internet). Other network connections and architectures are possible and contemplated.

Storage devices 128, 130 and 132 are representative of any number of storage devices, and may comprise any of a variety of types of storage media, such as a hard disk drive, disk volume, server blade optical drive, flash drive, tape drive, tape volume, robotic tape library, or other storage medium. Storage devices 128, 130 and 132 may be coupled to network 125 via data storage controller 126. Data storage controller 126 may be a server or other computing device configured to manage storage devices 128, 130 and 132.

Applications servers 102 and 104 and nodes 110 and 115 of FIG. 1 may comprise various hardware and software components. The hardware components may include one or more processors, memory devices, and input/output (I/O) devices, connected together via a bus architecture. The software components may include an operating system or a portion of an operating system stored in a memory device. The operating system may be any of various types of operating systems, such as Microsoft Windows®, Linux®, Unix®, Solaris®, Apple® Mac OS or iOS, Android®, or others. The operating system may be operable to provide various services to the user and may support the execution of various programs such as database applications, software agents, or any of a variety of other applications.

In other embodiments, the number and type of clusters, application servers, nodes, virtual machines, data storage controllers, networks, and storage devices is not limited to those shown in FIG. 1. Any number and combination of application servers and nodes may be interconnected in network architectures via various combinations of modem banks, direct LAN connections, wireless connections, WAN links, etc.

Figure 2:
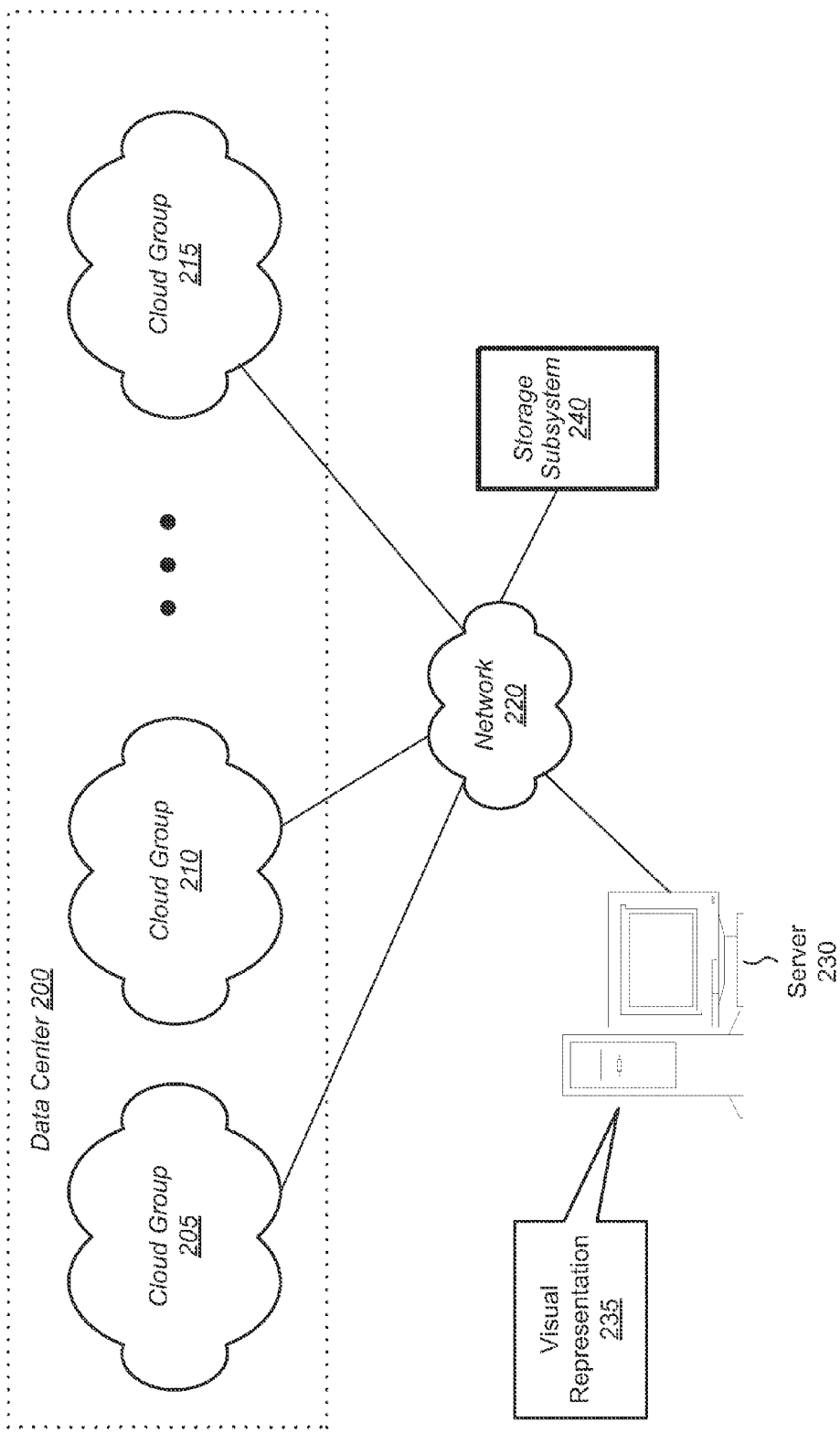
FIG. 2 illustrates a block diagram of another embodiment of a data center.

Referring now to FIG. 2, a block diagram of another embodiment of a data center is shown. Data center 200 may include cloud groups 205, 210, and 215, which are representative of any number of cloud groups which may be included within data center 200. Each cloud group may include any number of virtual machines, nodes, and clusters. Cloud groups 205, 210, and 215 are coupled to network 220, as are server 230 and storage subsystem 240. Server 230 may be utilized to provision and manage the overall system of data center 200. Server 230 may be utilized by a user or administrator for performing a variety of tasks related to data center 200. An administrator may provision virtual machines, allocate storage, reclaim storage, and perform many other tasks on server 230.

Server 230 may execute a plurality of software applications, including a software application for generating visual representation 235. Visual representation 235 may provide a graphical representation of the status of data center 200. Each cloud group 205, 210, and 215 may be represented by a graphical indicator, and each graphical indicator and its place within the visual representation 235 may provide an insight into the status of the corresponding cloud group.

Figure 3:
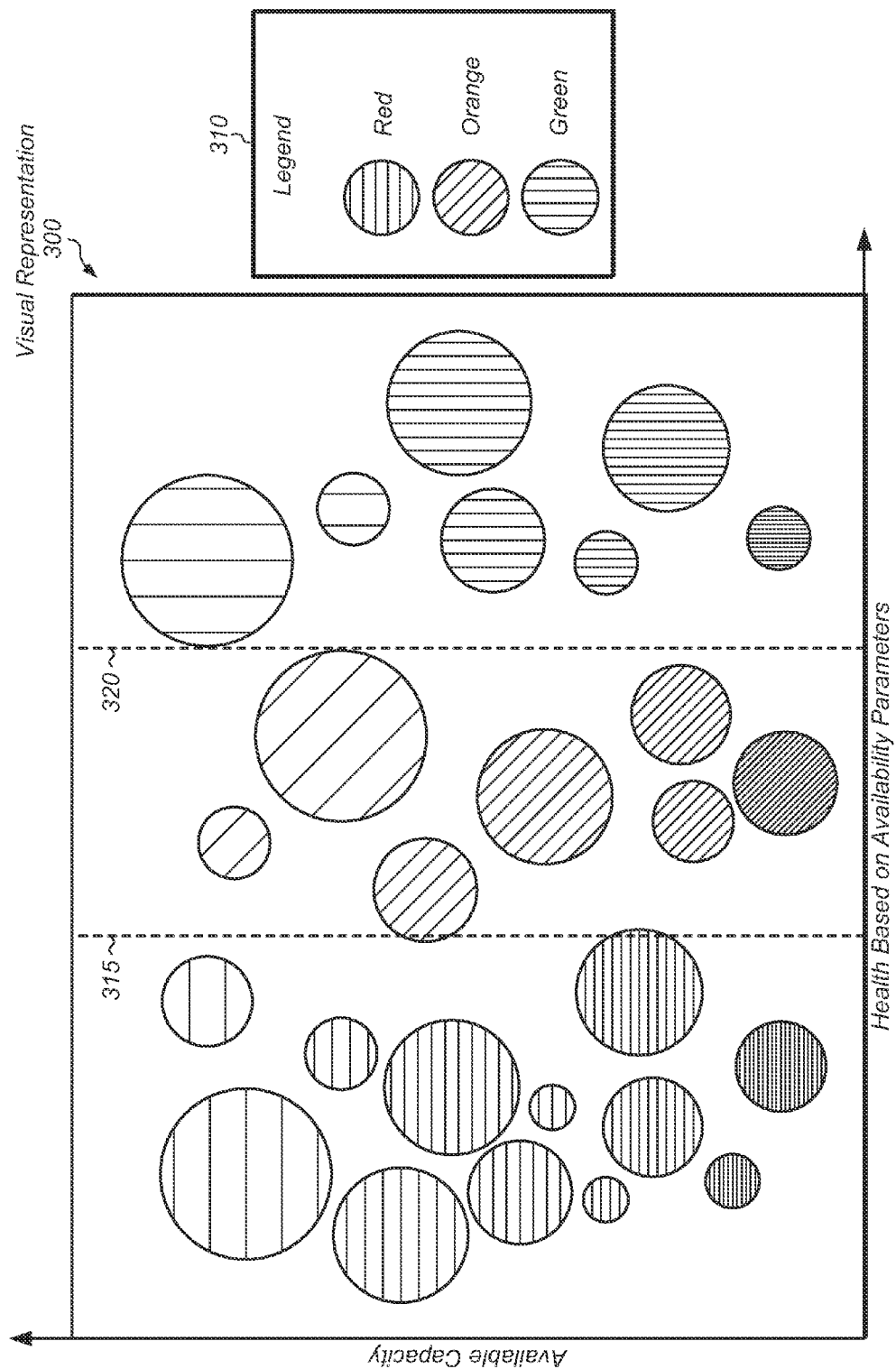
FIG. 3 is a diagram that illustrates a visual representation of a data center in accordance with one or more embodiments.

Referring now to FIG. 3, one embodiment of a visual representation of a data center is shown. Visual representation 300 may be generated by a server configured to monitor the status of a data center. In one embodiment, visual representation 300 may utilize a scatter plot to represent the cloud groups of the data center. The term "scatter plot" may be broadly defined as a diagram that displays values for two variables for a set of data. Each circle shown in representation 300 may represent a cloud group within the overall data center. The size of the circle may indicate the total capacity of the corresponding cloud group. The total capacity may correspond to aggregated central processing unit (CPU) resources, memory size, storage space, disk I/O, and network I/O. In other embodiments, other parameters may be monitored and included in the total capacity value. The color of the circle may indicate the health of the respective cloud group. The health may be based on aggregate availability parameters.

Legend 310 provides an illustration of the mapping of a type of circle with the color that may be used to represent it in one embodiment. For example, circles with horizontal lines may represent the color red, circles with diagonal lines may represent the color orange, and circle with vertical lines may represent the color green. In a color view of visual representation 300, the circles shown may be represented with the colors indicated in legend 310.

The total capacity, indicated by the size of the circle, may be a value that is computed from the aggregated metrics, and the value may be based on a formula that combines each metric multiplied by a weighting factor. The formula may be adjusted by a user depending on specific operating conditions or other considerations. In some embodiments, a user or administrator may configure the visual representation to set which parameters to include in the overall capacity. For example, in one embodiment, a user may select the CPU speed as the only parameter which is included in the capacity value. In another embodiment, memory capacity may be selected by the user, and the size of the circle may represent the memory capacity of the corresponding cloud group. In a further embodiment, two or more parameters may be combined and used to generate the capacity value.

The vertical axis, or Y-axis, of the scatter plot shown in FIG. 3 may measure the available capacity (i.e., available resources) of the plurality of cloud groups in the data center. In other embodiments, the Y-axis may measure unused capacity of each cloud group. The unused capacity may give an approximation of available capacity, although available capacity may be significantly less than unused capacity in some cases. Circles near the base of the Y-axis correspond to cloud groups that have a small amount of available capacity. Also, circles near the bottom of the chart may be represented with a more dense color. This may be a deeper, darker intensity of the color used for the circle. This is indicated in visual representation 300 by lines that are closer together within the circle. The circles near the top of the chart are depicted with lines that are further apart. Lines that are further apart within a circle may be represented with a less dense, or lighter, color in a color version of visual representation 300. For example, a red circle may indicate a "faulted" health status of the corresponding cloud group. If the corresponding cloud group has a large amount of available capacity, then the red circle may be located near the top of the graph. Also, the color of the circle may be a lighter, less dense red, resembling more of a pink color. A red circle with little or no available capacity may be located near the bottom of the graph and may be of a dark, or denser, red, resembling more of a maroon color. This pattern may be utilized for orange and green circles as well, with the darkness, or density, of the color representing the utilization of the cloud group's available capacity.

The horizontal axis, or X-axis, may measure the health of the cloud groups based on availability parameters. In other words, the health of a cloud group may be based on the fault resilience and disaster tolerance of the cloud group. Circles to the right-side of the chart may represent the healthy cloud groups, and circles to the left-side of the chart may represent the faulted cloud groups. The circles falling in the middle of the X-axis may represent the at-risk cloud groups. Additionally, the color of a given circle may also be used to indicate the health of the corresponding cloud group. For example, a red circle may be used to represent a faulted cloud group, an orange circle may be used to represent an at-risk cloud group, and a green circle may be used to represent a healthy cloud group. The dashed line 315 is used to indicate a separation between faulted cloud groups and at-risk cloud groups. Circles to the left of dashed line 315 represent faulted cloud groups while circles to the right of dashed line 315 represent at-risk cloud groups. Similarly, dashed line 320 may be used to indicate a separation between at-risk cloud groups and healthy cloud groups. Circles to the left of dashed line 320 represent at-risk cloud groups while circles to the right of dashed line 320 represent healthy cloud groups. In some embodiments, dashed lines 315 and 320 may be within visual representation 300, while in other embodiments, dashed lines 315 and 320 may be excluded from visual representation 300. Dashed lines 315 and 320 represent thresholds that may be used to differentiate between the different health states of cloud groups.

Furthermore, in other embodiments, a mixture of two colors may indicate that the circle falls somewhere between two health states. For example, a red-orange color may indicate the health of the cloud group is somewhere between "faulted" and "at-risk". The blending of colors may be used to provide several different gradations of health status, depending on the embodiment. In other embodiments, the X-axis and Y-axis of the chart may be used to measure other parameters besides those shown in FIG. 3.

In other embodiments, other shapes besides circles may be utilized. For example, squares, triangles, or any other shapes may be utilized. Also other numbers of colors may be utilized in other embodiments. Also, in other embodiments, other dimensions may be utilized, such as a third dimension to depict a third metric associated with the cloud groups. Also, in further embodiments, other entities besides cloud groups may be represented by circles (or other shapes) in the visual representation. For example, a cluster, node, server, computing device, or other entity may be represented in other embodiments.

Figure 4:
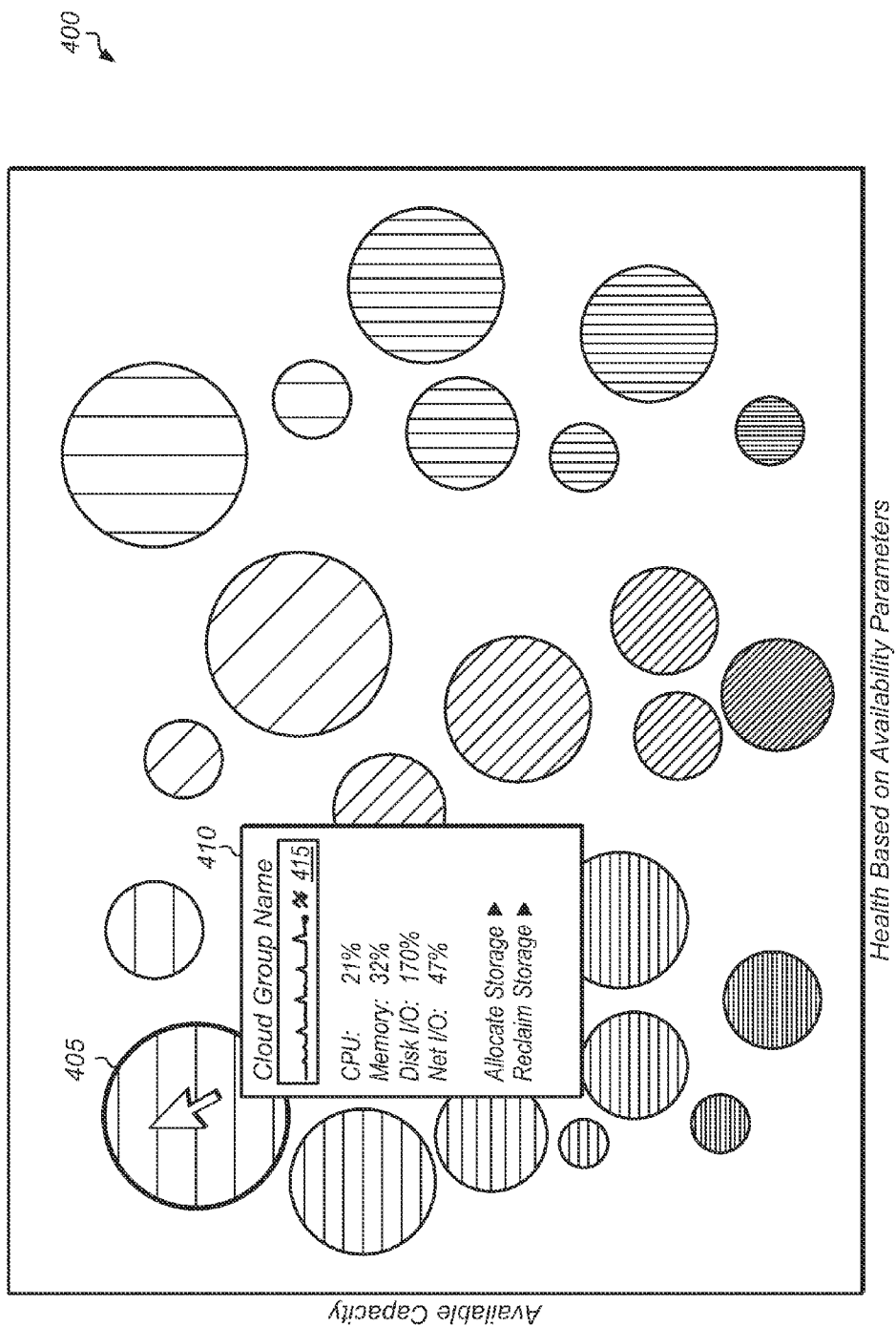
FIG. 4 illustrates another view of a visual representation in accordance with one or more embodiments.

Referring now to FIG. 4, another view of one embodiment a visual representation of a data center is shown. The visual representation 400 may include a feature such that when a mouse cursor is placed over any of the circles in the chart, then a pop-up box with more information about the particular cloud group may be displayed. The circle 405 may be highlighted with a darker outline to indicate that this particular circle has been selected by the user. When circle 405 has been selected, then box 410 may be displayed with additional, more detailed status information regarding the cloud group represented by circle 405.

Box 410 may include a cloud group name and a plurality of status or performance indicators. These performance indicators may include a CPU utilization metric, a memory utilization metric, a disk I/O utilization metric, and a network I/O utilization metric. Box 410 may also include a history 415 which shows a plot of the utilization over a recent interval. History 415 may be a plot of any of the utilization metrics or a combination of two or more of the metrics, depending on the embodiment. In other embodiments, the pop-up box 410 may include additional information. In one embodiment, in order to get box 410 to be displayed, the mouse cursor may be moved over the circle, causing more information to be displayed. In another embodiment, the mouse cursor may be clicked (single or double) over the circle for the pop-up information box 410 to be displayed. The user may configure the visual representation software to choose which information is included in pop-up box 410.

The box 410 may also include options for taking a particular action for the chosen cloud group. One selectable action may be to allocate storage for the given cloud group. Another selectable action may be to reclaim storage for the given cloud group. In other embodiments, other actions may be available for selection from the pop-up box 410. It is noted that many other types of menus, taskbars, pop-up boxes, other features of a graphical user interface (GUI), and other options for taking actions may be included in visual representation 400.

Figure 5:
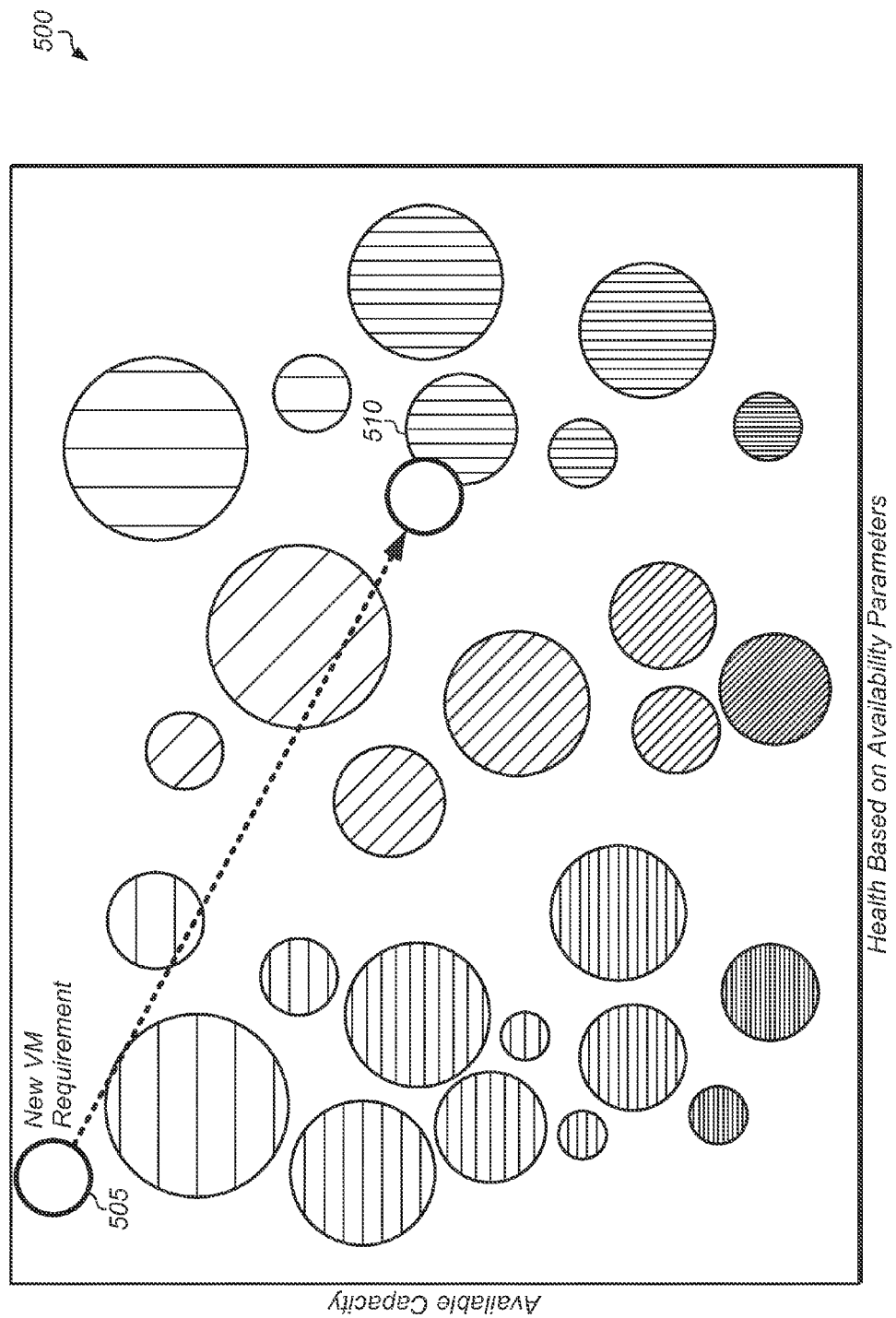
FIG. 5 illustrates one embodiment of placing a virtual machine within the data center.

Referring now to FIG. 5, one embodiment of allocating a virtual machine in a data center is shown. A user or administrator may determine that a new virtual machine or application should be allocated to the data center. The visual representation 500 allows for a new virtual machine or other application to be placed at the best suited cloud group for handling the requirements of the application. In response to receiving a request for a new virtual machine, the visual representation 500 may generate circle 505, which appears on the top left of the chart. Circle 505 may represent the new virtual machine, and the size of circle 505 may represent and correspond to the amount of resources needed for the new virtual machine. The new circle 505 may be displayed in a color that is not used in the rest of the chart for the circles that represent cloud groups.

As shown in FIG. 5, circle 505 may be placed in circle 510. Circle 510 may represent a cloud group, and circle 510 may be selected automatically by the underlying software based on its available capacity and health. In some embodiments, the software may highlight one or more circles that are good fits for hosting the new virtual machine. Then, a user may select the circle in which to place the virtual machine represented by circle 505. The user may drag and drop circle 505 onto a circle that the user deems is the best suited cloud group for hosting the virtual machine. The user may determine which cloud group is the best fit based on the location of its corresponding circle in chart 500.

After virtual machine circle 505 is placed within cloud group circle 510, then this may result in the actual virtual machine being allocated within the corresponding cloud group. In one embodiment, as a result of the drag and drop functionality of visual representation 500, a provisioning of the new virtual machine or other application may occur automatically. In another embodiment, the provisioning of the new application may occur at a later time. The drag and drop actions performed by the user may be considered a planning stage, and then at a later time, the actual provisioning may take place.

Figure 6:
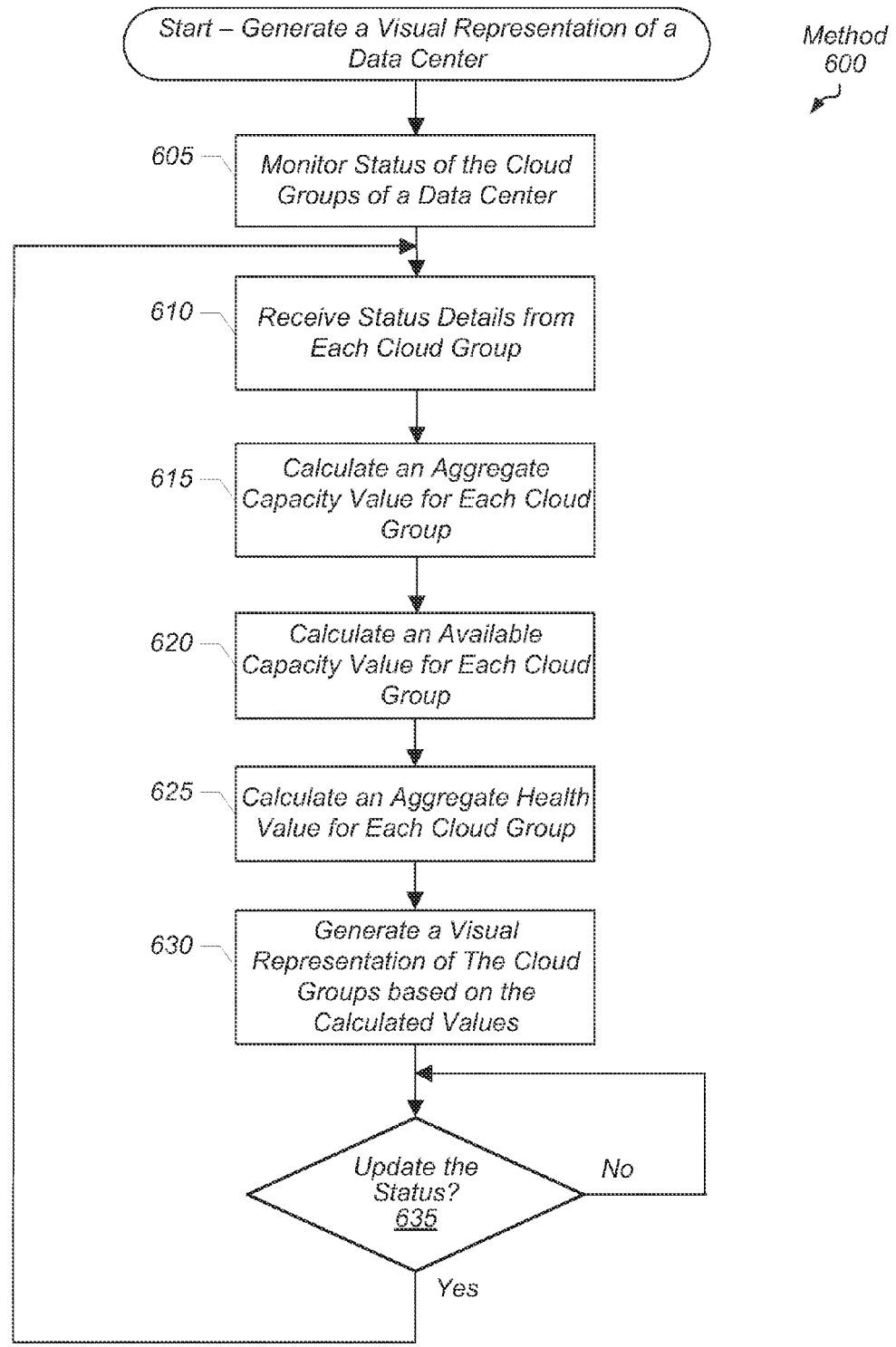
FIG. 6 is a generalized flow diagram illustrating one embodiment of a method for generating a visual representation of a data center.

Turning now to FIG. 6, one embodiment of a method 600 for generating a visual representation of a data center is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

The method 600 may begin by monitoring the status of the cloud groups of a data center (block 605). The monitoring may be performed by a software application executing on a server or other computing device. An administrator may utilize the software application for managing the data center and allocating the resources of the data center. While cloud groups are described within the context of FIG. 6 as being monitored and depicted in a visual representation, it is to be understood that method 600 may also be utilized for generating a visual representation for other types of computing resources (e.g., computer, router, server, cluster, network device, storage device, smartphone, tablet).

The monitoring application may receive status details from each cloud group in the data center (block 610). In one embodiment, each cloud group may be queried for its current operating status. In another embodiment, each cloud group may report its status to the data center management server on a regular basis. Each cloud group may be on a separate update schedule, such that cloud groups independently report their status at an interval that is different from the reporting intervals of other cloud groups. Alternatively, all of the cloud groups may generate status reports on the same schedule.

Based on the status reports, the management software application may calculate an aggregate capacity value for each cloud group (block 615). This aggregate capacity value (also referred to as an "aggregate resources value") may be based on CPU resources, memory size, disk I/O capacity, network I/O capacity, and any other relevant information associated with the cloud group. In one embodiment, a formula may be utilized for generating the aggregate capacity value. For example, if each cloud group has four status variables (CPU speed, memory size, disk I/O capacity, network I/O capacity), then each of these four variables could be weighted at 25% to generate the aggregate capacity value. Other weightings of the individual variables may also be used. Furthermore, more than or fewer than four variables may be used with the formula. For example, in another embodiment, only a single variable (e.g., memory size) may be utilized to calculate the capacity value. In various embodiments, the formula for calculating the aggregate capacity value may be configurable such that a user may modify the formula and adapt the formula according to changing circumstances or requirements.

Furthermore, an available capacity value may be calculated for each cloud group (block 620). The available capacity value may be based on the current utilization of one or more of the various resources of the cloud group, and the utilization of each of the various resources may be weighted according to the formula utilized for calculating the aggregate capacity value (in block 615). The available capacity value may also be referred to as an "available resources value". Additionally, an aggregate health value for each cloud group may be calculated (block 625). The aggregate health value may be based on the availability, fault resilience, and disaster tolerance of the cloud group. The aggregate health value may be calculated in a variety of ways, depending on the embodiment, and may be configurable by the user in determining what metrics and weightings are utilized in generating the value. It is noted that blocks 615, 620, and 625 may be performed simultaneously, or the order of these blocks may be rearranged, depending on the embodiment.

After the values of aggregate capacity, available capacity, and aggregate health have been calculated for the cloud groups in the data center, a visual representation may be generated of the cloud groups (block 630). The visual representation may be a chart of the cloud groups, and in various embodiments, the chart may be a scatter plot, graph, bubble chart, surface chart, plot, diagram, or any other suitable chart or graph type. The cloud groups may be represented by graphic symbols, and the graphic symbols may be placed in the visual representation chart based on their available capacity and aggregate health. The size of the graphic symbol may be based on the aggregate capacity of the corresponding cloud group. In one embodiment, the graphic symbols used to represent the cloud groups may be circles. In other embodiments, other graphic symbols may be utilized to represent the cloud groups.

In one embodiment, the X-axis of the visual representation may measure the aggregate health of the cloud groups, and the Y-axis may measure the available capacity of the cloud groups. The circles representing the cloud groups may be placed in the chart based on their aggregate health and available capacity values. For example, cloud groups with more available capacity may appear toward the top of the chart, which is similar to the physical world where less dense objects tend to float. In this way, the chart may be understood intuitively by an administrator or user who visually inspects the chart. In addition, the color of the circles may also be used to represent the aggregate health and available capacity values. In one embodiment, different colors may be utilized to represent different aggregate health states. For example, red may be utilized to represent a faulted state, orange may represent an at-risk state, and green may represent a healthy state. In other embodiments, other colors may be utilized, and other numbers and types of states may be represented by these colors. In addition, the density of the color may be used to represent the available capacity value of the corresponding cloud group. For example, a lighter color may be used to represent a large percentage of available capacity, while a darker color may represent a smaller percentage of available capacity. The darkness or lightness of the color of a circle may indicate how much available capacity is available.

After the visual representation has been generated (block 630), it may be determined if the status of the cloud groups should be updated (conditional block 635). The visual representation may be updated based on a regular schedule, and depending on the amount of time that has elapsed from the last update, new updates may be collected. If it is determined that the status does not need to be updated (conditional block 635), then the visual representation may remain unchanged and wait until more time has elapsed before collecting updates. If enough time has elapsed such that new updates on the status of the cloud groups are required (conditional block 635), then the method 600 may return to block 610 to receive status details from each cloud group.

After the visual representation has been generated, while performing the periodic updates to the status of the data center, the aggregate capacity value for each cloud group (block 615) may or may not be calculated on each status update. The aggregate capacity will only change if resources are added or removed from a cloud group, and this may happen infrequently when compared to changes to the utilized capacity and health.

Figure 7:
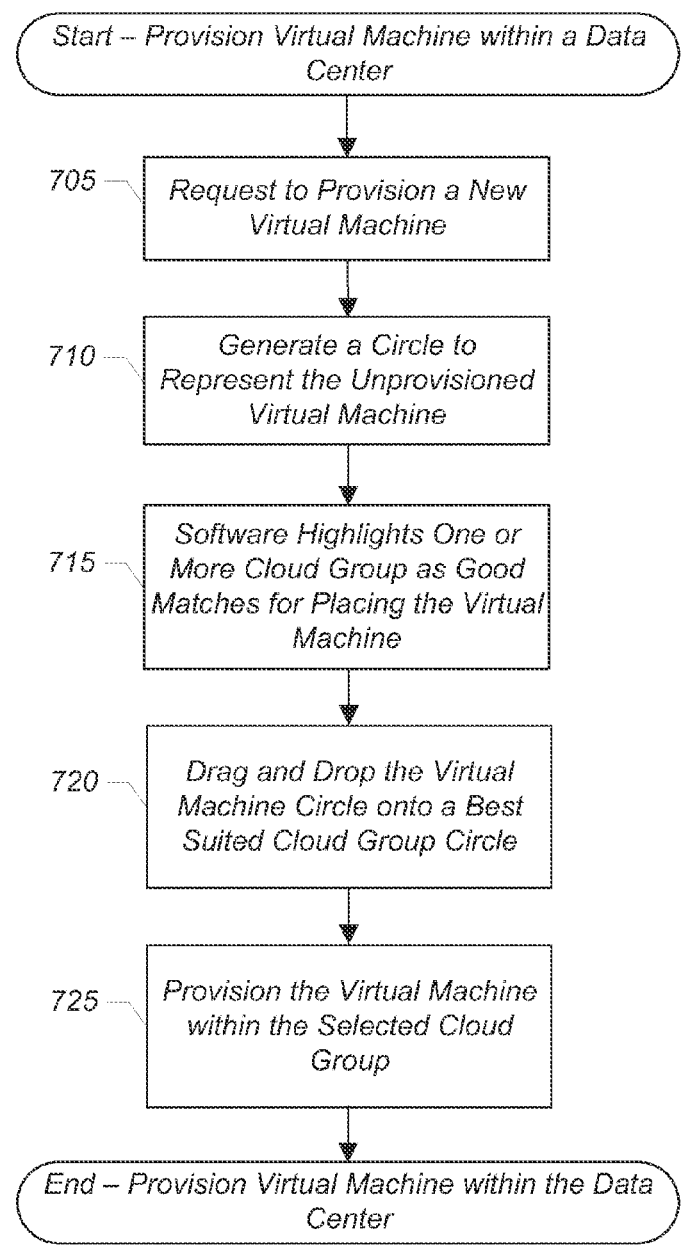
FIG. 7 is a generalized flow diagram illustrating one embodiment of a method for provisioning a virtual machine in a data center.

Referring now to FIG. 7, one embodiment of a method 700 for provisioning a virtual machine in a data center is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

The method 700 may begin with an administrator generating a request to provision a new virtual machine (block 705). Alternatively, an application or service other than a virtual machine may be provisioned. While method 700 is described as being performed for provisioning a virtual machine, it is to be understood that method 700 may be implemented for provisioning any type of application. An administrator may request to provision a new virtual machine, or the software may determine to provision a new virtual machine based on a defined policy for the data center. Next, a circle may be placed in an empty portion of the visual representation to represent the un-provisioned virtual machine (block 710). The size of the circle may be used to indicate the amount of resources that are needed to provision the new virtual machine.

Next, the underlying software application may highlight one or more cloud groups as good matches for placing the virtual machine (block 715). Cloud groups that are healthy and have a large amount of available capacity may be chosen by the application as good matches. Any number of matches may be highlighted, depending on the embodiment. Also, cloud groups that are not good matches may be temporarily faded or removed from the visual representation so that the user can focus on the best suited matches. In another embodiment, the user may determine which cloud groups are good matches by visually inspecting the visual representation. The good matches may be determined by the user based on the locations of the circles within the visual representation. For example, in one embodiment, the best matches may be located in the top right of the visual representation.

After block 715, the circle representing the un-provisioned virtual machine may be dragged and dropped onto the best suited cloud group circle (block 720). The dragging and dropping of the un-provisioned virtual machine may be part of a planning stage of provisioning the data center. One or more virtual machines and/or other applications may be provisioned during this planning stage. Then, at a later time, the virtual machine may be provisioned within the selected cloud group (block 725). This provisioning may be based on the drag-and-drop of the virtual machine on the selected cloud group, and the provisioning may occur immediately after the drag-and-drop or may occur later during a provisioning stage. After block 725, the method 700 may end.

It is noted that the above-described embodiments may comprise software. In such an embodiment, program instructions and/or a database (both of which may be referred to as "instructions") that represent the described systems and/or methods may be stored on a non-transitory computer readable storage medium. Generally speaking, a non-transitory computer readable storage medium may include any storage media accessible by a computer during use to provide instructions and/or data to the computer. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations.

What is claimed is:

1. A method for use in a processor, the method comprising:
utilizing a computing server to monitor a status of each computing resource of a plurality of computing resources;
calculating an available resources value and a health value for each computing resource of the plurality of computing resources, wherein the available resources value is based on utilization of at least a memory size of a corresponding computing resource and the health value is based on at least detecting whether the corresponding computing resource has faulted; and
generating a visual representation of the plurality of computing resources utilizing a chart, wherein:
each computing resource is represented by a single respective graphic symbol on the chart; and
a respective location of each graphic symbol within the chart is based at least in part on a corresponding available resources value and a corresponding health value; and
responsive to detecting a request to add a new entity to one of the plurality of computing resources:
placing a generated new graphic symbol representing the new entity on the chart, wherein a size of the new graphic symbol is based on an amount of resources required for the new entity; and
highlighting a graphic symbol that corresponds to a suitable computing resource for hosting the new entity.

2. The method as recited in claim 1, wherein the chart is a scatter plot, wherein an X-axis of the scatter plot measures health values, and wherein a Y-axis of the scatter plot measures available resources.

3. The method as recited in claim 2, the method further comprising calculating a respective aggregate resources value for each computing resource of the plurality of computing resources, wherein a size of each graphic symbol is based on the respective aggregate resources value of a corresponding computing resource, and wherein a color of each graphic symbol is based on a respective health value of a corresponding computing resource.

4. The method as recited in claim 3, wherein the computing resource is a cloud group, and wherein a status of each cloud group of a plurality of cloud groups in a data center are monitored.

5. The method as recited in claim 4, wherein the new entity is a new virtual machine to add to a suitable cloud group within the data center, wherein the method further comprises provisioning the new virtual machine in the suitable cloud group responsive to detecting the new graphic symbol being dragged to and dropped onto the graphic symbol that corresponds to the suitable cloud group.

6. The method as recited in claim 4, the method further comprising:
   detecting a placement of a mouse cursor over a given graphic symbol; and
   generating a pop-up box responsive to detecting the placement of the mouse cursor over the given graphic symbol, wherein the pop-up box comprises utilized capacity information of a plurality of resources in a corresponding cloud group, wherein the pop-up box further comprises one or more selectable actions including at least one of allocating storage and reallocating storage.

7. The method as recited in claim 1, wherein different available resources values of a corresponding computing resource are further represented by different densities of a given color.

8. A non-transitory computer readable storage medium comprising program instructions, wherein when executed the program instructions are operable to:
   monitor a status of each computing resource of a plurality of computing resources in a data center;
   calculate an available resources value and a health value for each computing resource of the plurality of computing resources, wherein the available resources value is based on utilization of at least a memory size of a corresponding computing resource and the health value is based on at least detecting whether the corresponding computing resource has faulted; and
   generate a visual representation of the plurality of computing resources utilizing a chart, wherein:
      each computing resource is represented by a graphic symbol on the chart;
      a respective location of each graphic symbol within the chart is based at least in part on a corresponding available resources value and a corresponding health value; and
   responsive to detecting a request to add a new entity to one of the plurality of computing resources:
      place a generated new graphic symbol representing the new entity on the chart, wherein a size of the new graphic symbol is based on an amount of resources required for the new entity; and
      highlight a graphic symbol that corresponds to a suitable computing resource for hosting the new entity.

9. The non-transitory computer readable storage medium as recited in claim 8, wherein the chart is a scatter plot, wherein an X-axis of the scatter plot measures health values, and wherein a Y-axis of the scatter plot measures available resources.

10. The non-transitory computer readable storage medium as recited in claim 9, wherein the program operations are further operable to calculate a respective aggregate resources value for each computing resource of the plurality of computing resources, wherein a size of each graphic symbol is based on a aggregate resources value of a corresponding computing resource, and wherein a color of each graphic symbol is based on a respective health value of a corresponding computing resource.

11. The non-transitory computer readable storage medium as recited in claim 10, wherein the computing resource is a cloud group, and wherein a status of each cloud group of a plurality of cloud groups in a data center are monitored.

12. The non-transitory computer readable storage medium as recited in claim 11, wherein the new entity is a new virtual machine to add to a suitable cloud group within the data center, wherein the program operations are further operable to provision the new virtual machine in the suitable cloud group responsive to detecting the new graphic symbol being dragged to and dropped onto the graphic symbol that corresponds to the suitable cloud group.

13. The non-transitory computer readable storage medium as recited in claim 11, wherein the program operations are further operable to:
   detect a placement of a mouse cursor over a given graphic symbol; and
   generate a pop-up box responsive to detecting the placement of the mouse cursor over the given graphic symbol, wherein the pop-up box comprises utilized capacity information of a plurality of resources in a corresponding cloud group, wherein the pop-up box further comprises one or more selectable actions including at least one of allocating storage and reallocating storage.

14. The non-transitory computer readable storage medium as recited in claim 8, wherein different available resources values of a corresponding computing resource are represented by different densities of a given color.

15. A system comprising:
   a plurality of computing resources, each comprising one or more application servers coupled to a plurality of computers operating in coordination with each other to increase the availability of an application;
   a network coupled to the plurality of computing resources; and
   a server coupled to the network, wherein the server comprises at least a processor, and wherein the server is configured to:
      monitor via the network a status of each of the computing resources;
      calculate an available resources value and a health value for each of the computing resources, wherein the available resources value is based on utilization of at least a memory size of a corresponding computing resource and the health value is based on at least detecting whether the corresponding computing resource has faulted; and
      generate a visual representation of the plurality of computing resources utilizing a chart, wherein:
         each computing resource is represented by a graphic symbol on the chart;
         a respective location of each graphic symbol within the chart is based at least in part on a corresponding available resources value and a corresponding health value; and
      responsive to detecting a request to add a new entity to one of the plurality of computing resources:
         place a generated new graphic symbol representing the new entity on the chart, wherein a size of the new graphic symbol is based on an amount of resources required for the new entity; and
         highlight a graphic symbol that corresponds to a suitable computing resource for hosting the new entity.

16. The system as recited in claim 15, wherein the chart is a scatter plot, wherein an X-axis of the scatter plot measures health values, and wherein a Y-axis of the scatter plot measures available resources.

17. The system as recited in claim 16, wherein the server is further configured to calculate a respective aggregate resources value for each cloud group of the plurality of cloud groups, wherein a size of each graphic symbol is based on the aggregate resources value of a corresponding cloud group, and wherein a color of each graphic symbol is based on a respective health value of a corresponding cloud group.

18. The system as recited in claim 17, wherein the new entity is a new virtual machine to add to a suitable cloud group within the data center, wherein the server is further configured to provision the new virtual machine in the suitable cloud group responsive to detecting the new graphic symbol being dragged to and dropped onto the graphic symbol that corresponds to the suitable cloud group.

19. The system as recited in claim 15, wherein the server is further configured to:
- detect a placement of a mouse cursor over a given graphic symbol; and
- generate a pop-up box responsive to detecting the placement of the mouse cursor over the given graphic symbol, wherein the pop-up box comprises utilized capacity information of a plurality of resources in a corresponding cloud group, wherein the pop-up box further comprises a plurality of selectable actions, and wherein the plurality of selectable actions comprises allocating storage and reallocating storage.

20. The system as recited in claim 15, wherein different available resources values of a corresponding computing resource are represented by different densities of a given color.

* * * * *